US012767612B2

(12) United States Patent
White, III et al.

(10) Patent No.: US 12,767,612 B2
(45) Date of Patent: Oct. 20, 2026

(54) SEALING INTERFACE

(71) Applicant: RAYTHEON TECHNOLOGIES CORPORATION, Farmington, CT (US)

(72) Inventors: Robert A. White, III, Meriden, CT (US); Brian T. Hazel, Avon, CT (US); Raymond Surace, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 769 days.

(21) Appl. No.: 18/157,450

(22) Filed: Jan. 20, 2023

(65) Prior Publication Data

US 2024/0246872 A1 Jul. 25, 2024

(51) Int. Cl.

*C04B 41/87* (2006.01)
*C04B 41/50* (2006.01)
*C04B 41/52* (2006.01)

(52) U.S. Cl.

CPC .......... *C04B 41/87* (2013.01); *C04B 41/5035* (2013.01); *C04B 41/5042* (2013.01); *C04B 41/5057* (2013.01); *C04B 41/522* (2013.01)

(58) Field of Classification Search

CPC .............. C04B 41/522; C04B 41/5057; C04B 41/5042; C04B 41/5035; C04B 41/87; F05D 2240/11; F05D 2300/6033; F05D 2240/12; F05D 2300/2261; F05D 2300/611; F01D 11/005; F01D 11/08; F01D 25/246; F01D 5/284

See application file for complete search history.

(56) References Cited

U.S. PATENT DOCUMENTS

| | | | | |
|---|---|---|---|---|
| 5,439,348 | A | 8/1995 | Hughes et al. | |
| 6,418,618 | B1 | 7/2002 | Burdgick | |
| 8,167,191 | B2 * | 5/2012 | Warrier | B23K 35/0238 228/122.1 |
| 10,024,175 | B2 | 7/2018 | Varney | |
| 10,401,028 | B2 | 9/2019 | Freeman et al. | |
| 10,458,653 | B2 | 10/2019 | Freeman et al. | |
| 10,465,534 | B2 | 11/2019 | Pitolaj et al. | |
| 10,472,976 | B2 | 11/2019 | Freeman et al. | |

(Continued)

FOREIGN PATENT DOCUMENTS

| | | | |
|---|---|---|---|
| FR | 3059323 | A1 | 6/2018 |

OTHER PUBLICATIONS

European Search Report for EP Application No. 24152997.3 dated May 29, 2024.

*Primary Examiner* — Courtney D Heinle
*Assistant Examiner* — Andrew Thanh Bui
(74) *Attorney, Agent, or Firm* — Carlson, Gaskey & Olds, P.C.

(57) ABSTRACT

A section of a gas turbine engine includes a ceramic component, a metallic component, a seal situated between the metallic component and the ceramic component at a sealing interface, a silicon-based coating disposed on the ceramic component at the sealing interface, and a non-reactive coating disposed on the metallic component at the sealing interface. The non-reactive coating provides thermochemical protection against interaction between the ceramic component, the silicon-based coating, and the metallic component. A method of providing a seal in a gas turbine engine is also disclosed.

20 Claims, 1 Drawing Sheet

(56) References Cited

U.S. PATENT DOCUMENTS

| | | | |
|---|---|---|---|
| 10,934,873 B2 | 3/2021 | Sarawate et al. | |
| 11,143,040 B2 | 10/2021 | McCaffrey et al. | |
| 11,466,585 B2 | 10/2022 | Arbona et al. | |
| 2012/0171039 A1* | 7/2012 | Huang | F01D 5/3092<br>29/888 |
| 2016/0160660 A1* | 6/2016 | Shi | B32B 3/30<br>427/249.2 |
| 2017/0030211 A1* | 2/2017 | Marin | F01D 11/005 |
| 2018/0306063 A1* | 10/2018 | Shoemaker | F01D 5/02 |
| 2020/0123911 A1* | 4/2020 | Ladru | F01D 11/122 |
| 2020/0141276 A1 | 5/2020 | Wolfe et al. | |
| 2022/0169574 A1 | 6/2022 | Shim et al. | |
| 2023/0015977 A1 | 1/2023 | Hazel et al. | |
| 2023/0019497 A1 | 1/2023 | Surace et al. | |

* cited by examiner

SEALING INTERFACE

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Various areas of the gas turbine engine include ceramic components adjacent to metallic components. Due to the chemical makeup of the ceramic and metallic components, there may be unwanted chemical reactions between the two.

SUMMARY OF THE INVENTION

A section of a gas turbine engine according to an exemplary embodiment of this disclosure, among other possible things includes a ceramic component, a metallic component, a seal situated between the metallic component and the ceramic component at a sealing interface, a silicon-based coating disposed on the ceramic component at the sealing interface, and a non-reactive coating disposed on the metallic component at the sealing interface. The non-reactive coating provides thermochemical protection against interaction between the ceramic component, the silicon-based coating, and the metallic component.

In a further example of the foregoing, at least one of the silicon-based coating and the non-reactive coating are machinable by at least one of grinding, ultrasonic machining, water guided laser, and milling.

In a further example of any of the foregoing, the silicon-based coating has a surface roughness of less than about 200 Ra.

In a further example of any of the foregoing, the silicon-based coating includes at least one of rare earth silicates, alkaline earth silicates, alkaline earth aluminosilicates, silicon, silicon oxides, silicon carbides, silicon oxycarbides, barium-magnesium aluminosilicate, mullite, zircon, hafnon, and combinations thereof.

In a further example of any of the foregoing, the silicon-based coating includes at least one of silicon, silicon oxides or silicon oxycarbides.

In a further example of any of the foregoing, the silicon-based coating is at least 50% atomic weight silicon.

In a further example of any of the foregoing, the silicon-based coating has a thickness of between about 20 and about 100 mils.

In a further example of any of the foregoing, the non-reactive coating is zirconia- or hafnia-based.

In a further example of any of the foregoing, the silicon-based coating acts as an environmental barrier.

In a further example of any of the foregoing, the ceramic component is a ceramic matrix composite component.

In a further example of any of the foregoing, the seal is a ceramic matrix composite seal.

A method of providing a seal in a gas turbine engine according to an exemplary embodiment of this disclosure, among other possible things includes providing a seal at a sealing interface between a ceramic component and a metallic component, disposing a silicon-based coating on the ceramic component at the sealing interface, and disposing a non-reactive coating on the metallic component at the sealing interface. The non-reactive coating provides thermochemical protection against interaction between the ceramic component, the silicon-based coating, and the metallic component.

In a further example of the foregoing, the method also includes machining at least one of the silicon-based coating and the non-reactive coating by at least one of grinding, ultrasonic machining, water guided laser, and milling. The machining smooths a surface of the silicon-based coating or the non-reactive coating.

In a further example of any of the foregoing, the silicon-based coating has a surface roughness of less than about 200 Ra after the machining.

In a further example of any of the foregoing, the silicon-based coating rare earth silicates, alkaline earth silicates, alkaline earth aluminosilicates, silicon, silicon oxides, silicon carbides, silicon oxycarbides, barium-magnesium aluminosilicate, mullite, hafnon, zircon, and combinations thereof.

In a further example of any of the foregoing, the silicon-based coating is at least 50% atomic weight silicon.

In a further example of any of the foregoing, the non-reactive coating is zirconia- or hafnia-based.

In a further example of any of the foregoing, the silicon-based coating acts as an environmental barrier.

In a further example of any of the foregoing, the ceramic component is a ceramic matrix composite component.

In a further example of any of the foregoing, the seal is a ceramic matrix composite seal.

DETAILED DESCRIPTION

Figure 1:
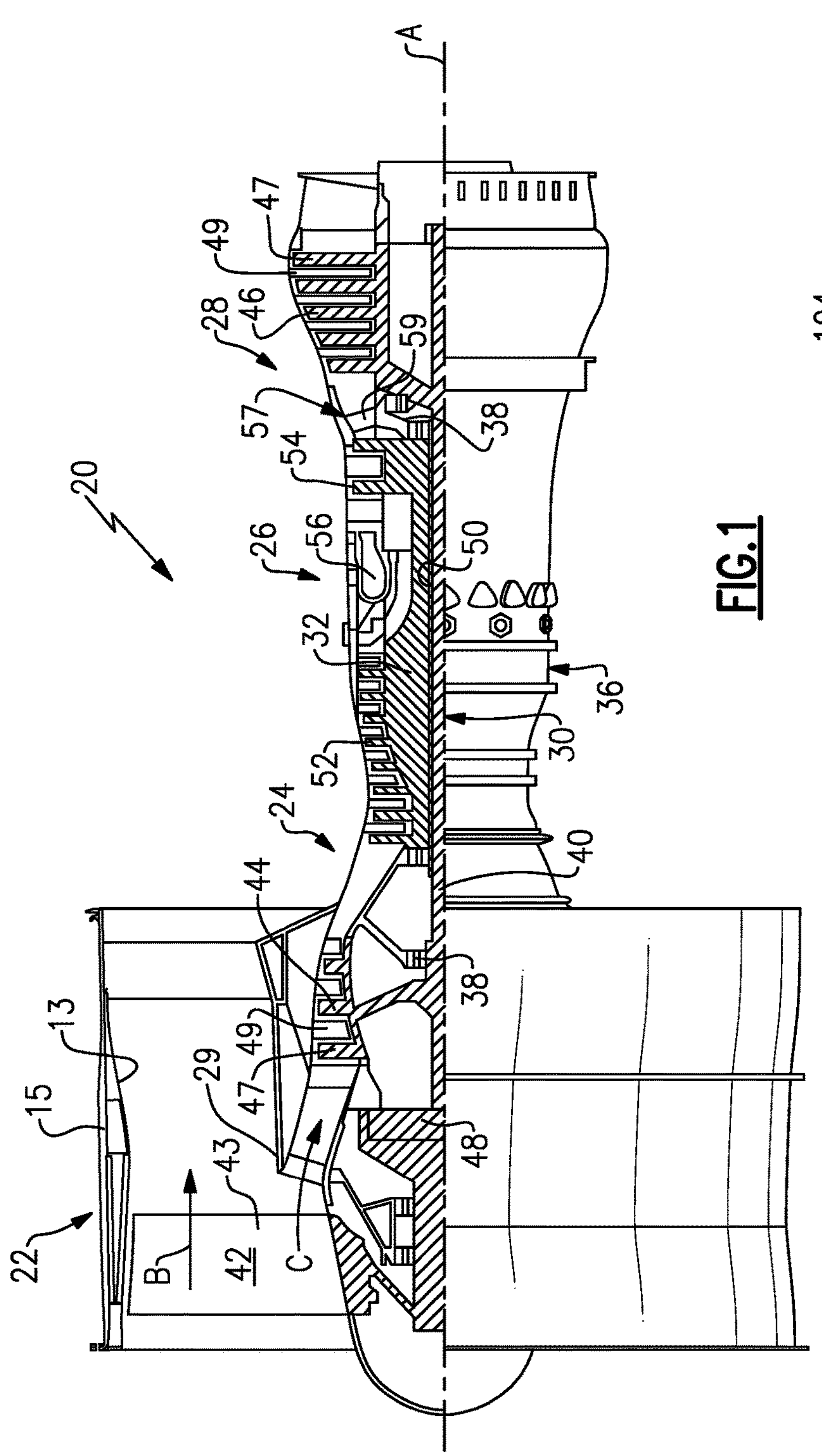
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram } ^\circ \text{R})/(518.7^\circ \text{R})]^{0.5}$. The corrected fan tip speed can be less than or equal to 1150.0 ft/second (350.5 meters/second), and can be greater than or equal to 1000.0 ft/second (304.8 meters/second).

Various areas of the engine 20 include seals. For instance, the turbine section 28 may include seals between adjacent platforms of the vanes of the rows of vanes. As another example, the turbine section 28 may include seals between tips of the blades in the rows of blades and engine 20 casing structures, known as blade outer air seals or BOAS. Other examples are also contemplated.

Figure 2:
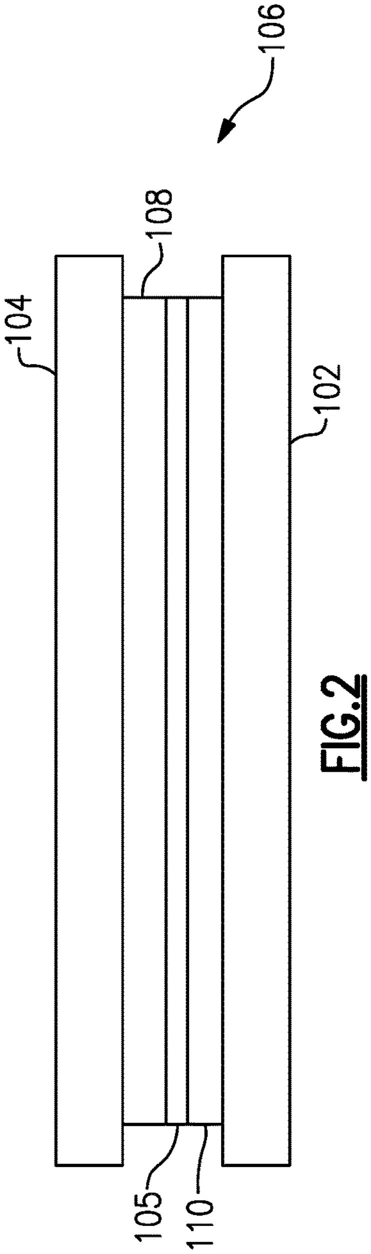
FIG. 2 schematically illustrates a ceramic component adjacent to a metallic component in the gas turbine engine of FIG. 1.

FIG. 2 schematically illustrates two components in the gas turbine engine 20. The first component 102 is a metallic component and the second component 104 is a ceramic component, such as a ceramic matrix composite. Ceramic matrix composites ("CMCs") are known in the art and will not be described in detail herein, but generally include ceramic-based reinforcements such as fibers (which may be continuous) disposed in a ceramic-based matrix material. In the case of ceramic matrix composite seals, the reinforcements can be two-dimensional/three-dimensional textiles made from unidirectional, woven, braided, knitted, or non-woven fibers. The components 102/104 are arranged adjacent one another with an interface 106 between them.

The components 102/104 can be any component of the gas turbine engine 20, but in one example are not in the path of the core air flow C. In one particular example, the component 102 is an engine 20 casing structure and the component 104 is a component that is attached to the engine casing structure such as a hook of a vane in the turbine section 28 or compressor section 24, a nozzle liner such as for the example nozzle discussed above, or flanges of a blade outer air seal.

A seal 105 is situated at a sealing interface 106 between the components 102/104. The seal 105 can be any kind of ceramic matrix composite seal.

A silicon-based coating 108 is disposed on the second component 104 at the sealing interface 106. The silicon-based coating 108 is machinable in that it can be subject to grinding, ultrasonic machining, water guided laser, milling, or another machining method after being applied by any conventional method to reduce it thickness and/or smooth its surface without any negative effects to its integrity. In general, the silicon-based coating 108 provides a smoother sealing surface than the underlying CMC component 104 either before or after machining, which contributes to improved efficacy of the seal between the components 102/104. For example, the silicon-based coating 108 has a final surface roughness of less than about 200 Ra after being applied, or after machining if the silicon-based coating 108 is subject to machining.

The silicon-based coating 108 may include rare earth silicates, alkaline earth silicates, alkaline earth aluminosilicates, silicon, silicon oxides, silicon carbides, silicon oxycarbides, barium-magnesium aluminosilicate, mullite, zircon, or hafnon. In a particular example, the silicon-based coating 108 includes silicon, silicon oxides or silicon oxycarbides. In one example, the silicon-based coating 108 is at least 50% atomic weight silicon.

In one example, the silicon-based coating 108 has a thickness between about 20 and about 100 mils. Because the coating 108 is relatively thin, it can be used in areas of the engine 20 with tight tolerances for adjacent components, such as between a vane and vane support, between a vane and blade outer air seal, and between a blade outer air seal and blade outer air seal carrier. The silicon-based coating can accommodate stress buildup at the sealing interface 106 and has good coefficient of thermal expansion match with the component 104.

The silicon-based coating 108 is the outermost coating on the component 104 at the sealing interface 106. In some examples, the silicon-based coating 108 acts as an environmental barrier.

In some examples, other coatings are also disposed on the component 104.

A non-reactive coating 110 is disposed on the component 102. The non-reactive coating 110 is generally non-reactive with respect to the component 102, the component 104 and any coatings thereon, including the silicon-based coating 108, and provides thermochemical insulation between the metal of the component 102 and the CMC component 104 and any coatings thereon, including the silicon-based coatings 108. Unwanted chemical reactions between the metal of the component 102 and the CMC component 104 and any coatings thereon, including the CMC component 104 can degrade or otherwise interfere with the longevity or effectiveness of the seal 105, sealing interface 106, and each of the components 102/104. The non-reactive coating can be machinable like the silicon-based coating 108. In general, the non-reactive coating 110 is free of free silicon. The non-reactive coating 110 may be, for instance, zirconia- or hafnia-based material. In some particular examples, one or more metallic bond coat layers may be disposed between the component 102 and the non-reactive coating 110 to enhance bonding between the non-reactive coating 110 and the component 102. For example, the non-reactive 110 has a final surface roughness of less than about 200 Ra after being applied, or after machining if the non-reactive coating 110 is subject to machining.

In general, the non-reactive coating 110 provides a smoother sealing surface than the underlying metal component 102 either before or after machining, which contributes to improved efficacy of the seal between the components 102/104.

As used herein, the term "about" has the typical meaning in the art, however in a particular example "about" can mean deviations of up to 10% of the values described herein.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A section of a gas turbine engine, comprising:

a ceramic component;

a metallic component;

a seal situated between the metallic component and the ceramic component at a sealing interface;

a silicon-based coating disposed on the ceramic component at the sealing interface; and a non-reactive coating disposed on the metallic component at the sealing interface, the seal located between, and spacing-apart, the silicon-based coating and the non-reactive coating, the non-reactive coating providing thermochemical protection against interaction between the ceramic component, the silicon-based coating, and the metallic component.

2. The section of claim 1, wherein at least one of the silicon-based coating and the non-reactive coating are machinable by at least one of grinding, ultrasonic machining, water guided laser, and milling.

3. The section of claim 1, wherein the silicon-based coating has a surface roughness of less than about 200 Ra.

4. The section of claim 1, wherein the silicon-based coating includes at least one of rare earth silicates, alkaline earth silicates, alkaline earth aluminosilicates, silicon, silicon oxides, silicon carbides, silicon oxycarbides, barium-magnesium aluminosilicate, mullite, zircon, hafnon, and combinations thereof.

5. The section of claim 4, wherein the silicon-based coating includes at least one of silicon, silicon oxides or silicon oxycarbides.

6. The section of claim 1, wherein the silicon-based coating is at least 50% atomic weight silicon.

7. The section of claim 1, wherein the silicon-based coating has a thickness of between about 20 and about 100 mils.

8. The section of claim 1, wherein the non-reactive coating is zirconia- or hafnia-based.

9. The section of claim 1, wherein the silicon-based coating acts as an environmental barrier.

10. The section of claim 1, wherein the ceramic component is a ceramic matrix composite component.

11. The section of claim 1, wherein the seal is a ceramic matrix composite seal.

12. A method of providing a seal in a gas turbine engine, comprising:

providing a seal at a sealing interface between a ceramic component and a metallic component;

disposing a silicon-based coating on the ceramic component at the sealing interface; and disposing a non-reactive coating on the metallic component at the sealing interface, the seal located between, and spacing-apart, the silicon-based coating and the non-reactive coating, the non-reactive coating providing thermochemical protection against interaction between the ceramic component, the silicon-based coating, and the metallic component.

13. The method of claim 12, further comprising machining at least one of the silicon-based coating and the non-reactive coating by at least one of grinding, ultrasonic machining, water guided laser, and milling, wherein the machining smooths a surface of the silicon-based coating or the non-reactive coating.

14. The method of claim 13, wherein the silicon-based coating has a surface roughness of less than about 200 Ra after the machining.

15. The method of claim 12, wherein the silicon-based coating rare earth silicates, alkaline earth silicates, alkaline earth aluminosilicates, silicon, silicon oxides, silicon carbides, silicon oxycarbides, barium-magnesium aluminosilicate, mullite, hafnon, zircon, and combinations thereof.

16. The method of claim 12, wherein the silicon-based coating is at least 50% atomic weight silicon.

17. The method of claim 12, wherein the non-reactive coating is zirconia- or hafnia-based.

18. The method of claim 12, wherein the ceramic component is a ceramic matrix composite component, and the seal is a ceramic matrix composite seal.

19. The section of claim 1, wherein the seal has a first side in contact with, and sealing against, the silicon-based coating, and a second, opposite side in contact with, and sealing against, the non-reactive coating.

20. The section of claim 19, wherein a surface of the non-reactive coating that is sealed against the seal is smoother than an underlying surface of the metallic component that the non-reactive coating is disposed on.

* * * * *